United States Patent [19]

Kleber et al.

[11] Patent Number: 5,737,521
[45] Date of Patent: Apr. 7, 1998

[54] TRACER SYSTEM FOR ANALYZING ERRORS IN RUNNING REAL-TIME SYSTEMS

[75] Inventors: Ulrich Kleber, München; Gerhard Goller, Taufkirchen; Jörg Neuhoff, München; Hans-Jörg Keller, Ottobrunn, all of Germany

[73] Assignee: Siemens Aktiengesellschaft, Munich, Germany

[21] Appl. No.: 619,532

[22] PCT Filed: Sep. 20, 1994

[86] PCT No.: PCT/DE94/01093

§ 371 Date: Mar. 21, 1996

§ 102(e) Date: Mar. 21, 1996

[87] PCT Pub. No.: WO95/09396

PCT Pub. Date: Apr. 6, 1995

[30] Foreign Application Priority Data

Sep. 28, 1993 [DE] Germany .............. 43 32 992.6

[51] Int. Cl.$^6$ .................................. G06F 11/00
[52] U.S. Cl. .................. 395/183.21; 395/183.15; 364/264; 364/264.7; 364/267; 364/267.2; 364/267.4; 364/267.5
[58] Field of Search .............. 395/183.21, 183.01, 395/183.08, 183.13, 183.15, 183.18, 183.22, 500; 364/264, 264.1, 264.2, 264.3, 264.4, 264.5, 264.7, 266, 267, 267.2, 267.4, 267.5

[56] References Cited

U.S. PATENT DOCUMENTS 4,462,077  7/1984  York ........................ 364/200
5,047,919  9/1991  Sterling et al. ............... 364/200
5,103,394  4/1992  Blasciak ...................... 395/575
5,127,103  6/1992  Hill et al. .................... 395/575
5,265,254  11/1993 Blasciak et al. ............... 395/700
5,297,274  3/1994  Jackson ....................... 395/500
5,303,369  4/1994  Borcherding et al. ......... 395/650

FOREIGN PATENT DOCUMENTS 0353886  6/1990  United Kingdom ............ G06F 11/00

OTHER PUBLICATIONS

IBM Technical Disclosure Bulletin, vol. 16, No. 2, Jul. 1973, J.F. Grant, "Nondegrading Operating System Hooking", p. 541.

IBM Technical Disclosure Bulletin, vol. 31, No. 9, Jan. 1989, "Method For Recording Program Execution", pp. 450–452.

Primary Examiner—Robert W. Beausoliel, Jr.
Assistant Examiner—Dieu-Minh Le
Attorney, Agent, or Firm—Hill, Steadman & Simpson

[57] ABSTRACT

A tracer system for analyzing errors of programs in running real-time systems. An activation device effects execution of predetermined functions at predetermined program points that are trace points. An executive device control operational sequence of a tracing process and instigates an immediate continuation of a attested program after execution of the functions at a trace point. An input for inputting trace points into the real-time system and for inputting associated functions during execution of the real-time system. A generating device for generating during program execution trace routines for execution of the predetermined functions and also for assigning memory areas for receiving data determined by the trace routines.

4 Claims, 3 Drawing Sheets

TRACER SYSTEM FOR ANALYZING ERRORS IN RUNNING REAL-TIME SYSTEMS

BACKGROUND OF THE INVENTION

The development of increasingly complex real-time systems, for example switching systems, has given rise to the requirement for corresponding test and error analysis capabilities. There are thus already a multiplicity of error analysis systems which facilitate error localization in such complex systems and with the aid of which extensive error analysis processes can be carried out and recorded. So-called tracer systems are an example of such test and error analysis systems.

It is known to connect such tracer systems via special connection units to the units of the real-time system which are to be tested, the processes occurring in these units being routed via these special connection units to the tracer system and logged and evaluated there. In the connection of these tracer systems, the real-time systems which are to be investigated, or at least the units of the real-time system which are respectively to be investigated, must be switched off. However, in the case of many real-time systems, in particular switching systems, this is to be avoided under any circumstances, since switching systems in particular are expected to meet extremely high requirements with respect to fault tolerance.

A tracer system is known from IBM Technical Disclosure Bulletin, Vol. 16, No. 2, July 1973, New York US, page 541, J.F. Grant "Nondegrading operation system hooking".

SUMMARY OF THE INVENTION

The invention is based on the object of specifying a tracer system which can carry out an analysis or errors during the running operation of a real-time system, without at the same time significantly restricting useful operation of the real-time system.

In general terms the present invention is a tracer system for analyzing errors of programs in running real-time systems. An activation means causes certain functions to be carried out at certain program points, so-called trace points. An executive means controls the operational sequence of the tracing process and instigates an immediate continuation of the tested program after the execution of the functions at a trace point. An input means allows input of trace points and the associated functions during the running of the real-time system. A generating means generates, during the program execution trace routines for execution of the previously defined functions and also creates memory areas for receiving data to be determined by the trace routines.

By means of the generation, according to the invention, of trace routines which store data determined during the tracing process in buffer memories, useful operation can be continued immediately without being noticeably interrupted by the tracing process at a respective trace point.

In a further development of the present invention a continuation means generates for each trace point in each case a program for simulation of the last original instruction. This program includes the return address to the tested program and started by the executive means after the execution of the trace routine. By means of this refinement, the leaving of a race point is dynamically optimized.

In a further development of the present invention, the activation means codes a trace-point number into each rerouting instruction to be introduced. The trace-point number serves as an index for the management date, required by the executive means, of the trace point. By means of this refinement, rapid locating of the management date necessary with respect to a trace point is ensured.

In a further development of the present invention, a monitoring means monitors how heavily the tracer system loads the real-time system during the tracing process, and deactivates the tracing process if a certain loading threshold is exceeded. By means of this refinement of the invention, inadmissible adverse effects of the tracer system on useful operation of the real-time system are avoided.

BRIEF DESCRIPTION OF THE DRAWING

The features of the present invention which are believed to be novel ,are set forth with particularity in the appended claims. The invention, together with further objects and advantages, may best be understood by reference to the following description taken in conjunction with the accompanying drawing, in which:

DESCRIPTION OF THE PREFERRED EMBODIMENTS

The basic principle of the tracer system according to the invention is that it on the one hand, in a way similar to a conventional debugger, introduces rerouting instructions (probes) into the program memory (ie. Overwrites the original program at selected points with the aid of a special machine instruction), or writes to particular hardware registers for fixing memory areas to be monitored, but on the other hand, when these halt points are reached, does not stop the real-time system in order to output data, or to wait for further commands. Instead, the operator must decide already before activating the tracing process which data are of interest to him at the halt points. This data is then copied into a special data memory (trace buffer memory) during the tracing process and can be read out later. Since, in the case of the tracer system according to the invention, no stop is made at halt points, these halt points are referred to below as trace points.

In contrast to tracer systems which are realized by hardware, the tracer system according to the invention takes the form of a software system in the real-time system and can be activated by management commands.

Figure 1:
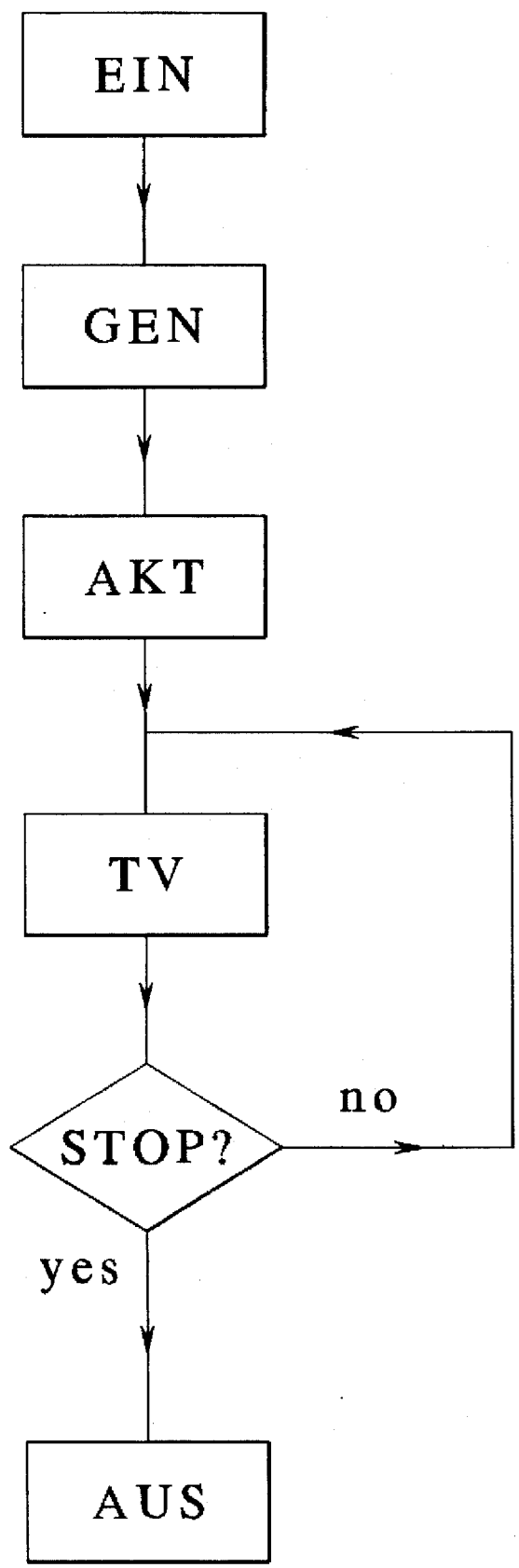
FIG. 1 shows the operational sequence of the tracing process according to the invention on the basis of the individual software means of the tracer system according to the invention.

FIG. 1 shows the operational sequence of the tracing process according to the invention on the basis of the individual software means of the tracer system according to the invention.

In a first process step, an input means (EIN) receives definitions for the individual trace points from the operator of the tracer system. This is performed by establishing as trace points either addresses in the program memory (replacing the original instructions by probes) or memory areas to be monitored by the tracer system, by writing to special hardware registers. It also involves establishing which data are to be copied when the respective trace point is reached. Also established are special functions, which are to be execute each time a trace point is reached. The said special functions may be, for example, additional conditions which have to be met on reaching a trace point (for example stop conditions or events for other tools, such as for example the operating system tracer, which logs operating system calls, or other special tracers, such as for example the call tracer, which logs the message flow within the switching software).

The definitions established by the operator in the first process step are finally combined subsequently with a name and are buffer-stored under this name in a trace buffer memory in the data memory segment of the tracer system.

All the inputs made in the first process step may be performed symbolically, ie. in a syntax which is similar to a source code.

In a second process step, a generating means (GEN) is used to generate on the basis of the definitions in the first process step special program segments, which are stored in the program memory and are called up later at the associated trace points. These program segments are referred to below as "trace routines". For generating these trace routines, the tracer system according to the invention contains a small compiler.

After their generation, the trace routines are stored by the compiler in the program memory, in order that they can be called up as soon as a trace point is reached. The trace routine then executes all the trace functions itself, or generates the events. Thereafter, the tested program can be continued with the aid of a code simulation, which is explained further below.

Figure 2:
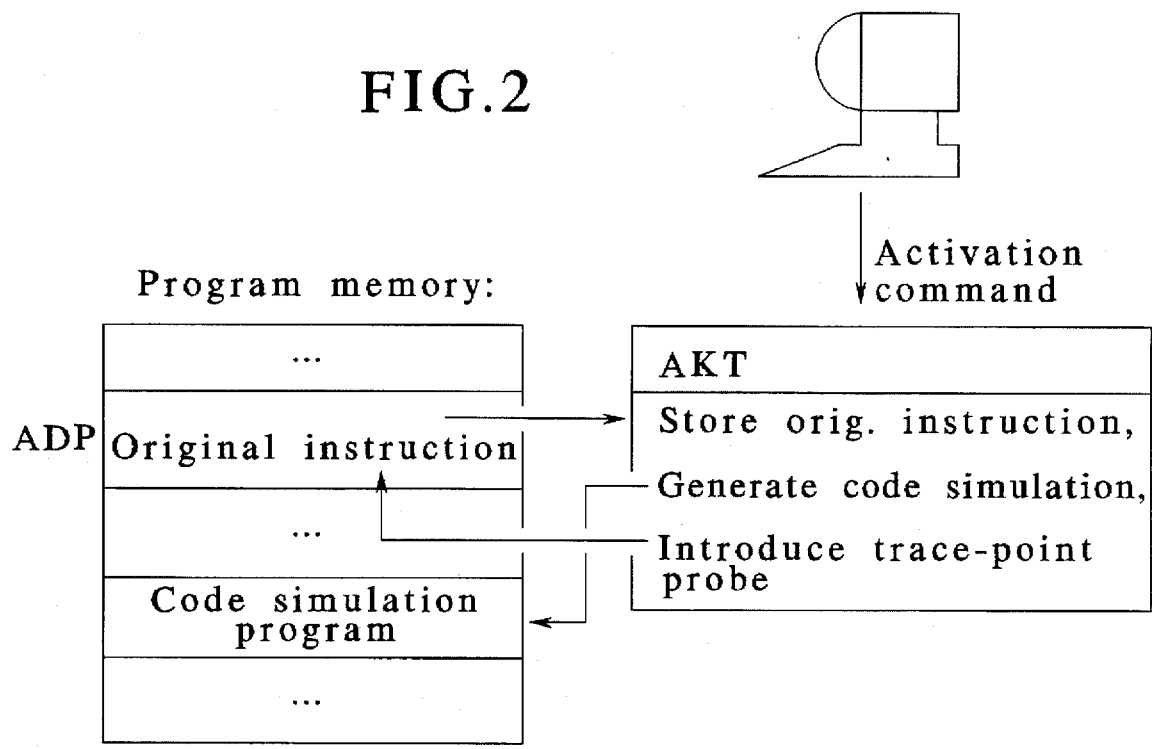
FIG. 2 shows the function of the activation means of the tracer system according to the invention.

In a third process step, the actual tracing process is activated by the operator with the aid of an activation means AKT. FIG. 2 shows the mode of operation of the activation means AKT.

For execution of the activation, the activation means initially stores the original instruction, located at a trace-point address ADP, in the trace buffer memory of the tracer system and then introduces the probe for the trace point into the code, or activates special debugging registers of the microprocessor. The tracing process may also be activated by timers or other events. A tracing process TV consists in that the program to be tested is executed in each case up to a trace point, where the trace routine generated for this trace point is then executed and, finally, the execution of the program to be tested is continued.

Apart from the means for activating the tracing process, the activation means also comprises means for deactivating the tracing process by the operator. The deactivation by stop conditions or events for other tools (see branching block "STOP48" in FIG. 1) is to be distinguished from the deactivation by the operator.

In a fourth process, the operator can, after the deactivation of the tracing process, separately request the data collected by the tracing process from an output means (AUS). On the basis of such a request, the data requested are read out of the trace buffer memory and are symbolically output according to the definition of the trace points.

During the tracing process, the system is dynamically influenced only minimally, since the call-up of the trace routines is dynamically optimized and the tracer system according to the invention utilizes all possibilities of the microprocessor to continue the tested program again as quickly as possible.

The symbolic input and output with the aid of the input and output means is realized by access to the symbol tables produced during compiling.

When introducing the probes for the trace points, the activation means AKT must change the machine code of the tested program, in that it overwrites an original instruction with the aid of a trap or interrupt instruction with the corresponding probe of the respective trace point. If a trace point is then reached during the operational sequence of the program to be tested, the processor initially branches to the tracer system. The latter then searches for the associated trace routine and executes it. Thereafter, it is ensured with the aid of a small program for code simulation that the program to be tested is immediately continued, to be precise with the overwritten original instruction.

For realizing a conventional continuation of the tested program, a conventional tracer system would—as every conventional debugger does—first of all have to restore the original code changed by the trace-point probe, execute the overwritten original instruction, and branch once again to the activation means of the tracer system, in order to bring in the probe again, and only then can the tested program begin after the probe.

In the form in which the tracer system according to the invention is realized by the exemplary embodiment, and referred to below as code simulation, the two writing operations in the program memory (restore original code, reintroduce probe) with the associated write-protect and cache handling, and the second program interruption (renewed branching to the activation means) are avoided and, as a result, considerable time is saved.

Figure 4:
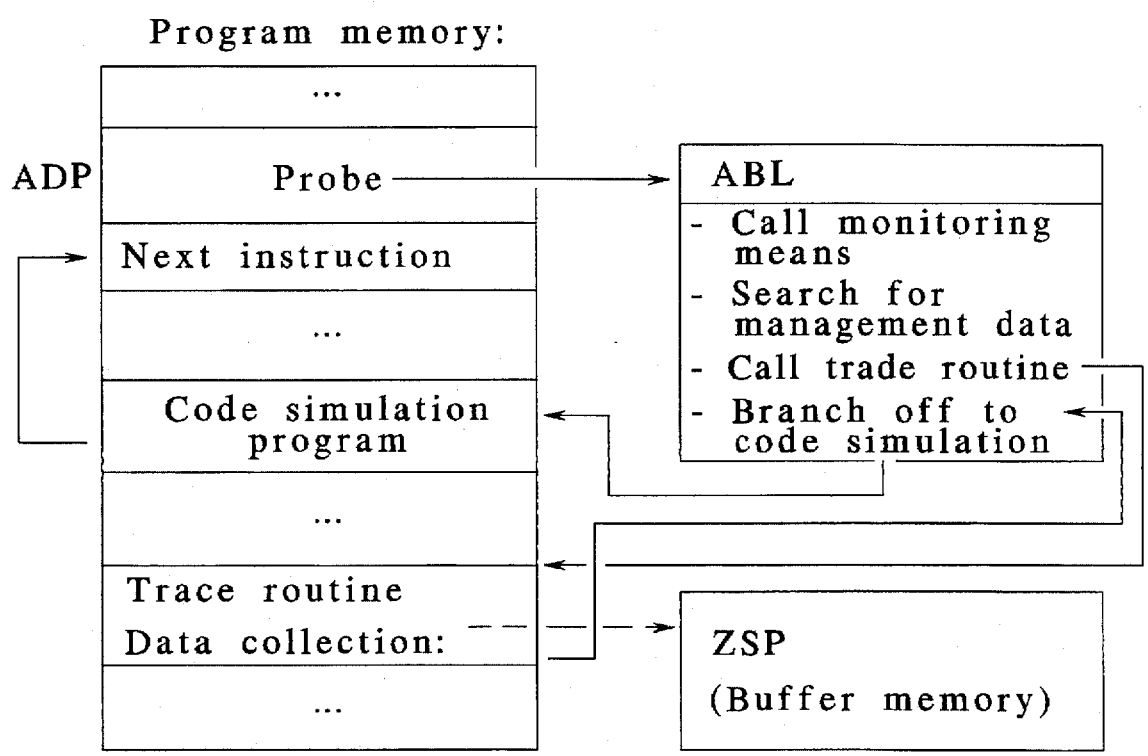
FIG. 4 shows the function of the executive means for controlling the operational sequence of the tracing process.

The code simulation according to the invention consists in that, straight after storing the original instruction, the activation means is used to generate with the aid of a continuation means according to the invention (contained in the activation means) a small program (additional code), (see FIG. 2), which serves for the simulation of this original instruction, includes the return address to the tested program and is started after completion of the trace routine (see FIG. 4).

A code simulation is particularly advantageous in the case of those processors which recognize only few instructions, which depend on their address in the main memory, or the current value of the program counter (for example the instruction "return 20 bytes"). This is the case, for example, with RISC processors.

Furthermore, in the case of most RISC processors, time can be saved by already coding into the TRAP instruction, which is used for the trace-point probe, a trace-point number which facilitates searching of the trace routine or of the management data of the tracer system necessary for the tracing process.

Figure 3:
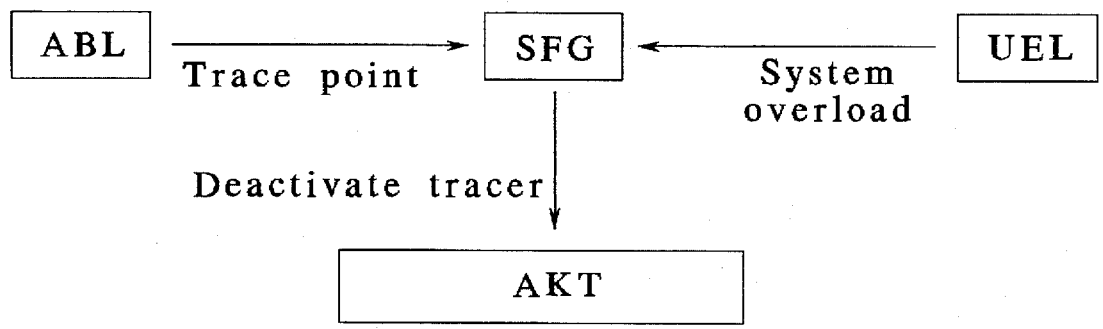
FIG. 3 shows the function of the monitoring means of the tracer system according to the invention.

A further important software means of the tracer system for use in running real-time systems, for example switching systems, is a monitoring means SFG for so-called "dynamic self control", which is described below in more detail with the aid of FIG. 3.

During a tracing process, the tracer system monitors itself, in that the monitoring means SFG determines how heavily the tracer system is loading the running real-time system, ie. how much computing time it takes up. If in this case certain loading thresholds are exceeded, the tracer system according to the invention automatically switches off with the aid of the monitoring means.

The monitoring means SFG is called up at each trace point by an executive means ABL for controlling the operational sequence of the tracing process and when this happens there are always two global counters continuing to count. One counter in this case counts how many trace points are encountered, while the other counter counts the number of data collected. At certain time intervals, the two counters are checked against maximum values and are reset. If the monitoring means establishes on the basis of the two counters or on the basis of overload information via an interface with an overload prevention system UEL of the real-time system that a continuation of the tracing process would endanger system operation, the monitoring means automatically instigates the deactivation of all the trace points step by step via the activation means, without taking up too much time at once for this deactivation.

The monitoring means SFG for dynamic self control can be switched off by the operator if an error analysis is required under overload conditions. This switching off can be restricted to certain overload stages.

FIG. 4 shows the mode of operation of the already mentioned executive means ABL for controlling the operational sequence of the tracing process. The executive means is called up at each trace point and thereupon instigates various actions. First of all, it calls up the monitoring means SFG. Then, it searches for the management data required for a trace point for controlling the further operational sequence. There then follows the call-up of the trace routine, which collects the data wanted at a trace point and subsequently stores the said data in a trace buffer memory ZSP. Finally, the executive means calls up the program for code simulation, which after its completion returns automatically to the next instruction, after the trace point, of the program to be tested.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A tracer system for analyzing errors of programs in running real-time systems, comprising:
    a) activation device which effects execution of predetermined functions at predetermined program points that are trace points;
    b) an executive device, which controls operational sequence of a tracing process and instigates an immediate continuation of a attested program after execution of the functions at a trace point;
    c) an input, which makes possible the device for inputting trace points into the real-time system and for inputting associated functions during execution of the real-time system; and
    d) a generating device for generating during program execution trace routines for execution of the predetermined functions and also for assigning memory areas for receiving data determined by the trace routines.

2. The tracer system as claimed in claim 1, wherein the tracer system further comprises a continuation device which generates for each trace point a program for simulation of a last original instruction, this program including a return address to the tested program and being started by the executive device after execution of the trace routine.

3. The tracer system as claimed in claim 1, wherein the activation device codes a trace point number into rerouting instruction to be introduced the trace point number serves as an index for management data, required by the executive device, of the trace point.

4. A tracer system for analyzing errors of programs in running real-time systems, comprising:
    a) activation device which effects execution of predetermined functions at predetermined program points that are trace points;
    b) an executive device, which controls operational sequence of a tracing process and instigates an immediate continuation of a attested program after execution of the functions at a trace point;
    c) an input for inputting trace points into the real-time system and for inputting associated functions during execution of the real-time system;
    d) a generating device for generating during program execution trace routines for execution of the predetermined functions and also for assigning memory areas for receiving data determined by the trace routines; and
    a monitoring device for monitoring how heavily the tracer system loads the real-time system during the tracing process, and for deactivating the tracing process if a predetermined loading threshold is exceeded.

* * * * *